United States Patent [19]
Dupuis

[11] 3,750,271
[45] Aug. 7, 1973

[54] TRANSISTOR STRUCTURE AND METHOD OF MANUFACTURE

[75] Inventor: Jean M. Dupuis, Kanata, Ontario, Canada

[73] Assignee: Microsystems International Limited, Montreal, Quebec, Canada

[22] Filed: Jan. 31, 1972

[21] Appl. No.: 222,174

[30] Foreign Application Priority Data

Jan. 28, 1972 Canada .............................. 133,394

[52] U.S. Cl. .................................... 29/587, 29/591
[51] Int. Cl. ............................................ B01j 17/00
[58] Field of Search ....................... 29/591, 587, 626

[56] References Cited

UNITED STATES PATENTS

| | | | |
|---|---|---|---|
| 2,666,873 | 1/1954 | Slade | 29/587 |
| 2,703,917 | 3/1955 | Pantchechikoff | 29/591 |
| 3,155,936 | 11/1964 | Kelley | 29/591 |
| 3,186,065 | 6/1965 | Hunt | 29/591 |

*Primary Examiner*—Charles W. Lanham
*Assistant Examiner*—W. Tupman
*Attorney*—L. Brooke Keneford

[57] ABSTRACT

This invention relates to an improved transistor structure, particularly a "12-type" germanium alloy transistor. The invention also relates to a method of manufacturing such a transistor, wherein the semiconductor device is free to move during attachment thereto of the connecting leads, thereby eliminating stress upon the device.

4 Claims, 7 Drawing Figures

TRANSISTOR STRUCTURE AND METHOD OF MANUFACTURE

The present invention relates to an improved transistor structure and to a method of manufacture thereof.

The invention particularly relates to, but is by no means restricted to transistor structures having a germanium alloyed device as the transistor element, packaged in what is known in the semiconductor industry as a "12-type" assembly. Such an assembly comprises a mounting plate called a "header" through which three leads are passed in a triangular pattern, the leads extending above one surface of the header to form short posts and extending from the other surface of the header as connection leads. Normally, the three posts subtend a right angle, and a rectangular tab is soldered at one end to the center post and extends across a diameter of the header surface between the remaining two posts and is soldered at its opposite end to the header surface. The tab has an orifice with the transistor element — usually a germanium wafer — located therein, the element having one electrode on each side of the tab and the tab functioning as the third electrode. Each of the remaining two posts is then connected to the adjacent electrode on the transistor element by a thin ribbon. This structure is unsatisfactory from a number of aspects. Firstly, the steps of soldering the tab to its support post and to the header surface and of soldering the ribbons to the transistor element electrodes and their associated posts do not lend themselves to automated machine processing. Thus the process is relatively expensive and inefficient. A second serious drawback is that once the tab is soldered to its supporting post, it becomes an essentially rigid structure. Any forces applied to the tab during the soldering thereof to the header surface or the attachment to the transistor elements of the ribbons which would tend to bend the tab were it free, will instead result in stress upon the tab and particularly the transistor element. Since the transistor element is extremely delicate, it is found that such stress often results in the degradation or fracture of the element thereby giving a substandard or inoperative device.

The purpose of the present invention is to provide a structure which lends itself to automated machine production and which will allow the tab freedom of movement during the attachment to the transistor element of electrodes, thus removing stress in the transistor element.

Thus according to the present invention, there is provided a transistor structure comprising an electrically insulative first support member having first, second and third electrically conductive post means extending from a first surface thereof, a substantially flat electrically conductive second support member having an orifice therethrough, said second support member being hingedly and rigidly mounted upon said second post means, a transistor element having first, second and third semiconductive regions, said transistor element being located and secured within said orifice with said second semiconductive region in electrical contact with said second support member, said first semiconductive region extending from a first surface of said second support member and said third semiconductive region extending from a second surface of said second support member, each of said first and third semiconductive regions being electrically isolated from said second support member, said first and third post means being bent into electrical contact with and bonded to said first and third regions of said semiconductor device respectively.

In a preferred embodiment of the invention, the transistor element is a germanium wafer and the first and third semiconductor regions form the emitter and collector regions of the element respectively and comprise indium fused with and diffused into the surfaces of the germanium wafer. The indium solder also provides the welding medium between the transistor element and the first and second post means. The second semiconductive region of the transistor element forms the base region thereof.

The invention further comprises a method of manufacturing the novel transistor structure of the invention, such method comprising the steps of hingedly mounting a substantially flat electrically conductive second support member upon an electrically insulative first support member, said first support member having first, second and third electrically conductive post means extending therefrom, said second support member provided with hinge means whereby said second support member is hingedly mounted upon said second post means of said first support member and said second support member further having an orifice therethrough and a transistor element secured therein, said transistor element having first, second and third semiconductive regions, said second semiconductive region being located within said orifice and in electrical contact with said second support member, each of said first and third semi-conductive regions being electrically isolated from said second support member, said first semiconductive region extending from a first surface of said second support member and said third semiconductive region extending from a second surface of said second support member; flattening the ends of said first and third post means remote from said first support member and bending said ends of said first and third post means into electrical contact with said first and third regions of said semiconductive device respectively; bonding said first and third post means to said first and third regions of said semiconductive device respectively, and bonding said second support member to said second electrically conductive post means.

The invention will now be described further by way of example only with reference to the accompanying drawings wherein.

Figures 1, 2, 3, 4, 5, 6, 7:
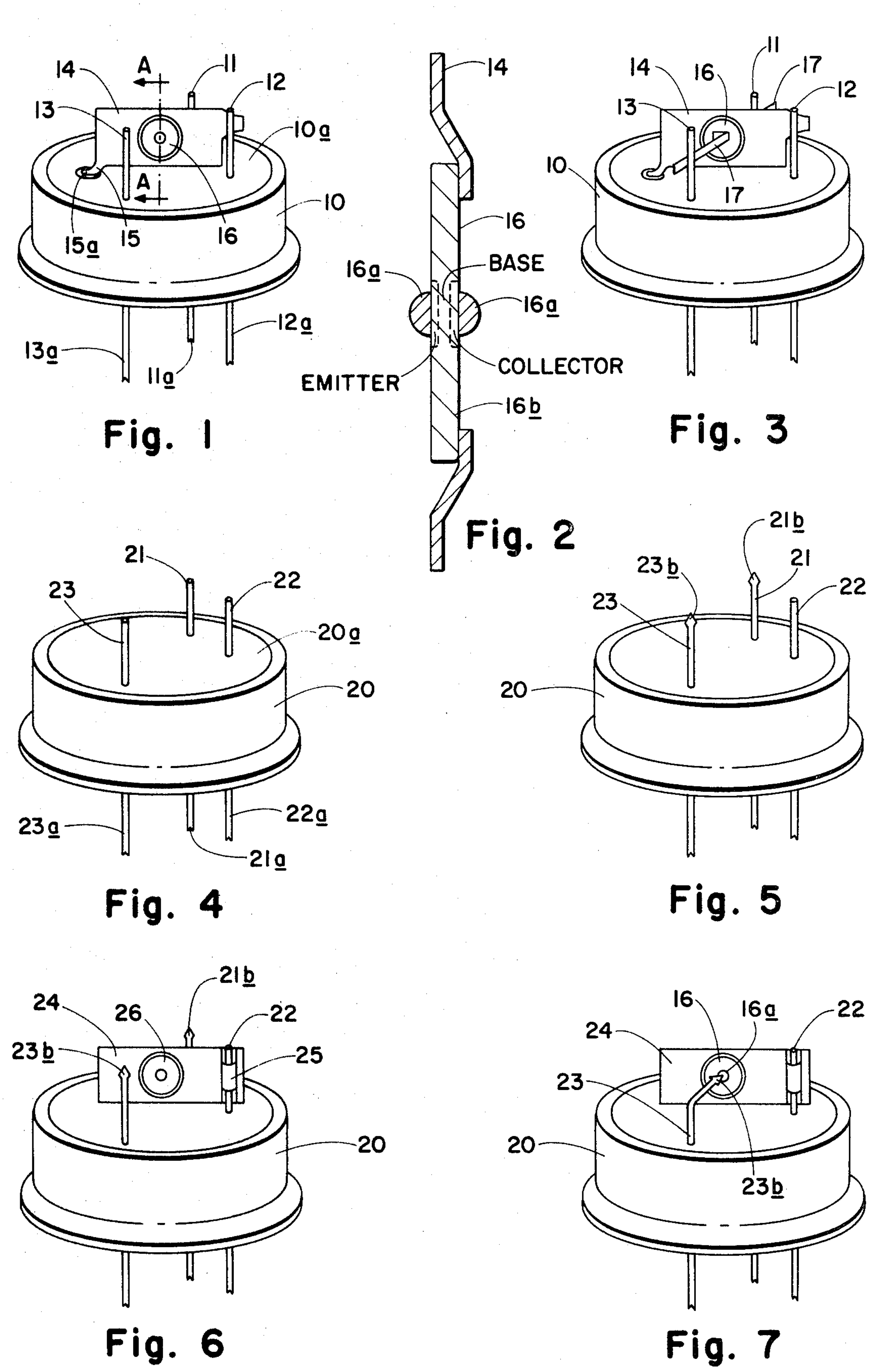
FIG. 1 shows a transistor structure according to the prior art during an intermediate stage of its manufacture.
FIG. 2 is a view on the line A-A of FIG. 1.
FIG. 3 shows the completed transistor structure of FIG. 1.

FIGS. 4 to 7 inclusive show various stages in the fabrication of a transistor structure according to the present invention.

Referring now to FIG. 1, there is shown a header 10 having posts 11, 12, and 13 extending from the upper surface **10*a* of the header and passing through the header to form leads 11*a*, 12*a* and 13*a* extending from the bottom surface of the header. A tab member 14 having a small protuberance 15 at one end thereof is welded to the post 12 at the end remote from the protuberance 15, and the protuberance 15 is soldered to the upper surface 10*a* of the header as shown at 15*a*. The tab 14 has approximately centrally thereof an orifice therethrough, the edges of which are dished and are soldered to a semiconductor device 16, the semiconductor device being a germanium transistor element. As shown in FIG. 2, the transistor element is produced by forming a blob of indium solder 16***a* over a central area of each surface of a germanium wafer 16*b* — the areas being juxtaposed and spaced — the indium diffusing into these surface areas to form emitter and collector regions respectively. The base region of the transistor is between the emitter and collector regions and is in electrical contact through the remainder of the wafer with the tab member 14. The collector and emitter regions are, of course, electrically isolated from the tab member. Since the tab member 14 is welded to the post 12, the post 12 and its associated lead 12*a* forms the base connection for the device. The posts 11 and 13 are now connected to the respective emitter and collector regions of the device by means of ribbons 17 as shown in FIG. 3, the posts 11 and 13 with their respective leads 11*a* and 13*a* forming the emitter and collector connectors for the device respectively. Each ribbon 17 is welded close to one end thereof to a post 11 or 13 and the other end of the ribbon is bent through 90° so that it abuts the indium solder on the adjacent emitter or collector region of the device 16. Heat is then applied through the ribbons 17 in order to solder the ribbons to the device. As hereinbefore stated, this process, as well as being cumbersome from a manufacturing point of view, has the further disadvantage that if any stress is placed upon the tab during connection of the ribbons 17 — the tab 14 is not able to move of course because it is rigidly soldered to the post 12 and the header surface 10*a* — cracking or severe degradation of the semiconductor device 16 can result.

Referring now to FIGS. 4 to 7 inclusive there are shown steps in the production of a transistor structure according to the invention. In FIG. 4 there is shown a header 20 having posts 21, 22 and 23 extending from the upper surface 20*a* thereof, such posts passing through the header 20 and extending from the lower surface thereof to form leads 20*a*, 22*a* and 23*a* respectively. The ends of posts 21 and 23 are flattened to form spade-like ends as shown at 21*b* and 23*b* respectively in FIG. 5. The spade-like ends are then cropped to a length which will accomodate a transistor element between the tips thereof when the posts are bent inwardly toward one another to orient the spade-like ends horizontally and in juxtaposition as will hereinafter be explained. After cropping the post ends 21*b* and 23*b* as described above, a tab member 24 is placed upon the post 22 (see now FIG. 6). The tab member is of generally rectangular shape and at one end has a hinge portion formed therein, as indicated by reference numeral 25. The hinge portion fits over the post 22. Approximately centrally of the tab member 24 there is a circular orifice therethrough having a germanium transistor element 26 located and secured therein and constructed in similar manner to that described above with reference to the transistor element 16 and the tab 14 shown in FIGS. 1 and 2. The exact location of the orifice and the transistor element 26 therein is chosen so that when the tab is mounted upon the post 22 the transistor element falls between the posts 21 and 23.

Referring now to FIG. 7, after the tab 20 has been placed over the post 22 as hereinbefore described, the posts 21 and 23 are subjected to a bending operation whereby the flattened ends 21*b* and 23*b* are bent inwardly to contact and press into the adjacent indium solder blob at the surface of the transistor element. The indium solder is very soft and by flattening the post ends 21*b* and 23*b*, clean and easy penetration of the tip of each post end into the solder is achieved. By predetermining the point of bending on each post and the exact separation needed between the opposed ends 21*b* and 23*b* of the posts to accomodate snugly the transistor element, the extent of cropping to give the required exact length of each post can be measured and implemented during the cropping stage described above in connection with FIG. 5. The post ends 21*b* and 23*b* are then soldered to the abutting indium soldered surfaces of the transistor device and the tab 24 finally soldered to the post 22. Now, since the tab is free to turn about the post 22 during the bending and soldering operations on the post 21 and 23, any unevenness in the opposing forces applied against the sides of the tab during such operations will be absorbed by movement of the tab instead of resulting in stress upon the semiconductor device.

Furthermore, since the post flattening and cropping operations, the tab placement operation upon the post 22, the post bending and soldering operations and the final operation of welding the tab to the post 22 all lend themselves to machine operation, the entire process can easily be automated. For example, in a typical production-line process, the basic header assembly shown in FIG. 3 is first advanced to a post flattening station where the ends of the posts 21 and 23 are flattened to give the spade-like ends 21*b* and 23*b*. The assembly is then advanced to a cropping station where the post ends 21*b* and 23*b* are cropped to leave the posts the exact predetermined length necessary for the subsequent operations, as described above. The assembly then passes to a tab fitting station where the tab 24 is placed over the post 22. The assembly then passes to a bending station where the posts 21 and 23 are bent in a forming operation bringing the post ends 21*b* and 23*b* into abutment with the indium soldered surfaces of the transistor device. The assembly then passes to a soldering station where the post ends are soldered to the transistor device and finally, the assembly passes to a tab welding station where the tab 24 is welded to the post 22. Subsequently, the assembly is packaged in conventional manner.

Although the invention has been described with reference to an alloyed germanium transistor, it will be appreciated that the principle of the invention may be applied to any semiconductor device which may be mounted upon the tab 24 and electrically contacted with and bonded to the post ends 21*a* and 23*a*. This applies to other types of bipolar devices, such as, for example, silicon transistors and could also be applied to unijunction transistors, for example, field effect devices.

In view of the foregoing description, it will be appreciated that various embodiments of the invention will be readily apparent to those skilled in the art without departing from the spirit and scope of the invention as described and claimed herein.

What is claimed is:

1. A method of manufacturing a transistor structure which comprises the steps of:

hingedly mounting a substantially flat electrically conductive second support member upon an electrically insulative first support member, said first support member having first, second and third electrically conductive post means extending therefrom, said second support member provided with hinge means whereby said second support member is hingedly mounted upon said second post means of said first support member and said second support member further having an orifice therethrough and a transistor element secured therein, said transistor element having first, second and third semiconductive regions, said second semiconductive region being located within said orifice and in electrical contact with said second support member, each of said first and third semiconductive regions being electrically isolated from said second support member, said first semiconductive region extending from a first surface of said second support member and said third semiconductive region extending from a second surface of said second support member;

flattening the ends of said first and third post means remote from said first support member and bending said ends of said first and third post means into electrical contact with said first and third regions of said semiconductive device respectively;

bonding said first and third post means to said first and third regions of said semiconductive device respectively; and bonding said second support member to said second electrically conductive post means.

2. The method of claim 1 wherein said transistor element is a germanium wafer and said first and third semiconductive regions form the emitter and collector regions of said transistor element respectively and comprise indium fused with and diffused into the surfaces of said germanium wafer and said post ends are soldered to said first and third semiconductive regions of said transistor element, the second semiconductive region of said transistor element forming the base region thereof.

3. The method of claim 2 wherein each said post means comprises the end of a wire, each said wire passing through said first support member and extending from a second surface thereof as a connection lead for said transistor element.

4. The method of claim 1 wherein said second support member is in the form of a flat substantially rectangular tab.

* * * * *